United States Patent [19]

Schenk et al.

[11] 4,354,648
[45] Oct. 19, 1982

[54] AIRSTREAM MODIFICATION DEVICE FOR AIRFOILS

[75] Inventors: Karl M. Schenk; Peter T. Reynolds; M. H. Abla; Robert K. Wattson, Jr., all of Wichita, Kans.

[73] Assignee: Gates Learjet Corporation, Wichita, Kans.

[21] Appl. No.: 119,068

[22] Filed: Feb. 6, 1980

[51] Int. Cl.³ .................... B64C 3/58; B64C 21/10; B64C 23/06
[52] U.S. Cl. .................... 244/199; 244/200; 244/130
[58] Field of Search ............ 244/198, 199, 200, 213, 244/130; 416/236

[56] References Cited

U.S. PATENT DOCUMENTS

| 1,815,489 | 7/1931 | Albers et al. | 244/213 |
| 1,864,803 | 6/1932 | Clark | 416/236 |
| 2,453,403 | 11/1948 | Bogardus | 244/200 |
| 2,739,770 | 3/1956 | Fanti et al. | 244/200 |
| 2,852,209 | 9/1958 | Petre | 244/213 |
| 3,578,264 | 5/1971 | Kuethe | 244/199 |

FOREIGN PATENT DOCUMENTS

| 349958 | 11/1960 | Switzerland | 416/236 |
| 101442 | 9/1916 | United Kingdom | 244/200 |

Primary Examiner—Galen L. Barefoot
Attorney, Agent, or Firm—H. W. Oberg, Jr.; C. H. Castleman, Jr.; Raymond Fink

[57] ABSTRACT

An airfoil modification device that helps maintain airstream attachment to either upper or lower airfoil surfaces, the device in the form of a plurality of spaced, low profile rods arranged generally end-to-end and attached to the airfoil and generally normal to the airstream to define a serrated edge that induces multidirectional airstream turbulence.

17 Claims, 8 Drawing Figures

AIRSTREAM MODIFICATION DEVICE FOR AIRFOILS

BACKGROUND OF THE INVENTION

Airfoils may have airstream separation problems either at low or at high speeds. Airfoil stall occurs at low airspeeds (Mach numbers below about 0.15) when the airstream no longer can follow the airfoil contour and separates therefrom. Shock separation occurs at higher speeds (Mach numbers of, say, about 0.6 to about 0.9) when the airstream near the airfoil accelerates to supersonic speed and then decelerates suddenly at some location forward of the airfoil trailing edge. This deceleration is accompanied by sudden pressure rises and sometimes by airstream separation, which may excite airframe structure or movable surfaces such as ailerons, producing what are known as "buffeting" and, eventually, aileron "buzz".

Vortex generators are blade-like devices attached to upper or lower airfoil surfaces at various angles to generate turbulent flow in an airstream boundary layer of an airfoil. Vortex generators are known expedients to generate turbulent flow in an airstream boundary layer of an airfoil at either high or low speeds. The vortex generators extend the onset of separation by protruding from about 0.6 to about 1.1 of the airstream boundary layer to redirect the airstream over the airfoil for reattachment. For example, the vortex generators will reduce the onset of aileron buzz when placed upstream on the upper surface of an airfoil. Vortex generators may also be placed near the root section of a wing to maintain airflow attachment to an airfoil at low air speeds.

While vortex generators and other similar blade-type devices are used to create such turbulent flow, they have associated problems of creating high drag at high air speeds because of their large projection in relation to the boundary layer. The large projections make them susceptible to damage or loss through inadvertent actions of maintenance personnel.

SUMMARY OF THE INVENTION

In accordance with the invention, an airfoil device is provided that alters an airfoil's airstream. The device is preferably in the form of a plurality of spaced rod members arranged in end-to-end fashion in generally strips or rows which cumulatively define a serrated edge. The rods are attached to either upper or lower airfoil surfaces in such a manner to define a serrated edge protruding from the airfoil which is arranged generally normal to the airstream. The rod members have top surface portions and end portions which project into the airstream boundary layer as a means for inducing multidirectional turbulence to extend the onset of airstream separation at either low but preferably high air speeds.

An object of the invention is to provide an airfoil modification device which protrudes less than half-way into the airstream boundary layer of an airfoil to induce an effective turbulence which postpones the onset of airstream separation from the airfoil.

An advantage of the invention is that its low profile has less drag than other known devices (such as vortex generators) that effect turbulent flow in the airstream boundary layer.

Another advantage of the invention is that it eliminates the need for blade-like devices (i.e., vortex generators) which are subject to dislodgement because of their height which must extend more than half and preferably all the way through the boundary layer to become effective.

These and other objects or advantages of the invention will be apparent after reviewing the drawings and description thereof wherein.

DESCRIPTION OF PREFERRED EMBODIMENTS

Figure 1:
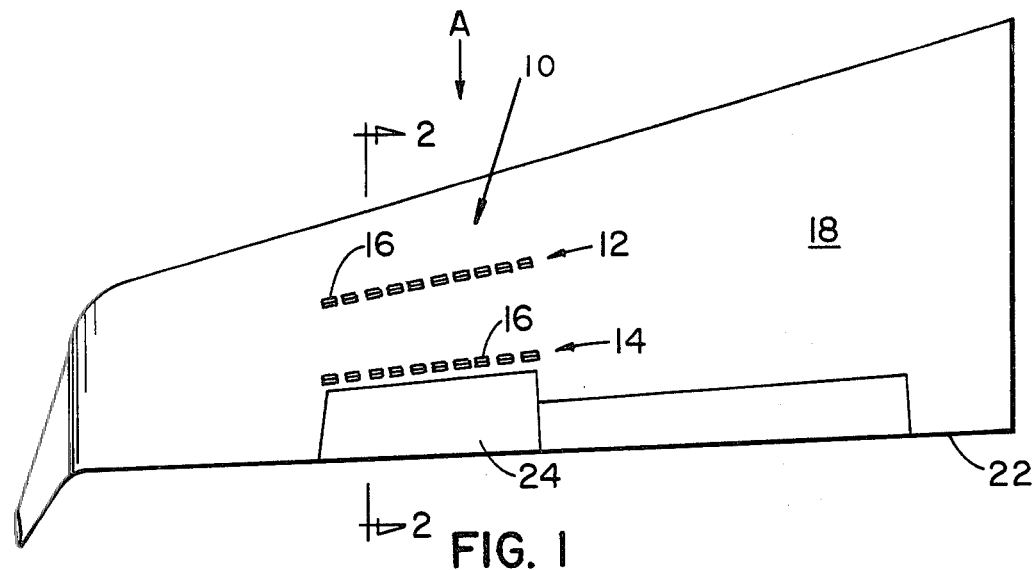
FIG. 1 is a plan view of an airfoil in the form of a wing with an aileron and showing strips or rows of the spaced rod members of the invention attached thereto.

Referring primarily to FIGS. 1–4, the airfoil modification device 10 for affecting portions of an airstream boundary layer 11 includes at least one row 12 or more rows 14 of a plurality of spaced, generally rod-shaped elements 16 or members arranged in generally end-to-end fashion on upper 18 or lower 20 airfoil surfaces. The rod elements may be an integral part of the airfoil, a part of a continuous strip, or more preferably, they are individual elements separately attached to an airfoil surface. Collectively, the rods of a row define a "serrated edge" on the airfoil surface.

For purpose of illustration, an airfoil of the wing type 22 is disclosed having a movable control surface such as an aileron 24.

One or more rows of spaced elements are positioned upon a portion of the wing upstream of the aileron. Each rod element 16 is oriented with its length generally normal to an airstream A at an angle from about −30 to about 30 30 degrees. Rod elements linearly aligned in a row so that a top surface 26 of each element is oriented substantially normal to the airfoil airstream has proven satisfactory. More preferably, the top surface of each element is oriented at a constant percentage of local chord.

The rod elements are optionally spaced S from each other a distance that is less than the individual lengths L of the adjacent rod elements. For example, the spacing is from about 0.2 to about 0.7 of the element length. Rod elements of equal length at equal spacing may be used.

Figures 4, 5:
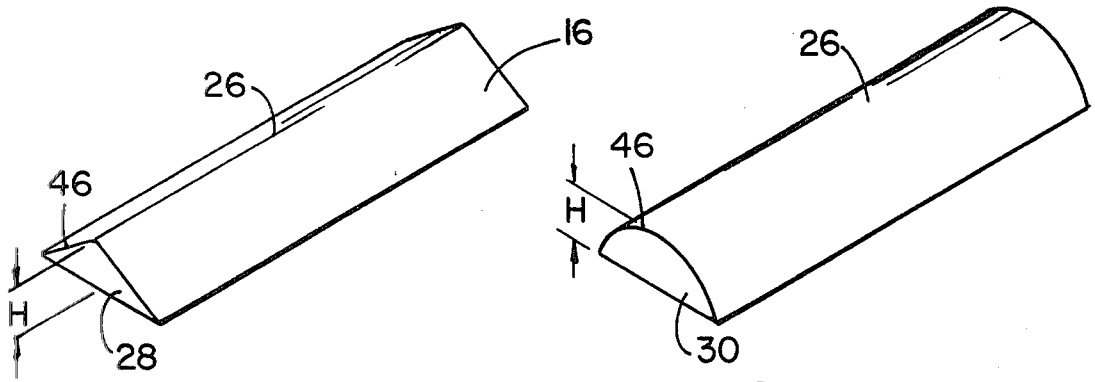
FIG. 4 is an isometric view of a rod member used with the airfoil as shown in FIGS. 1, 2, and 3.
FIGS. 5, 6 and 7 are isometric views showing rod members of varying cross sections.
Figures 6, 7:
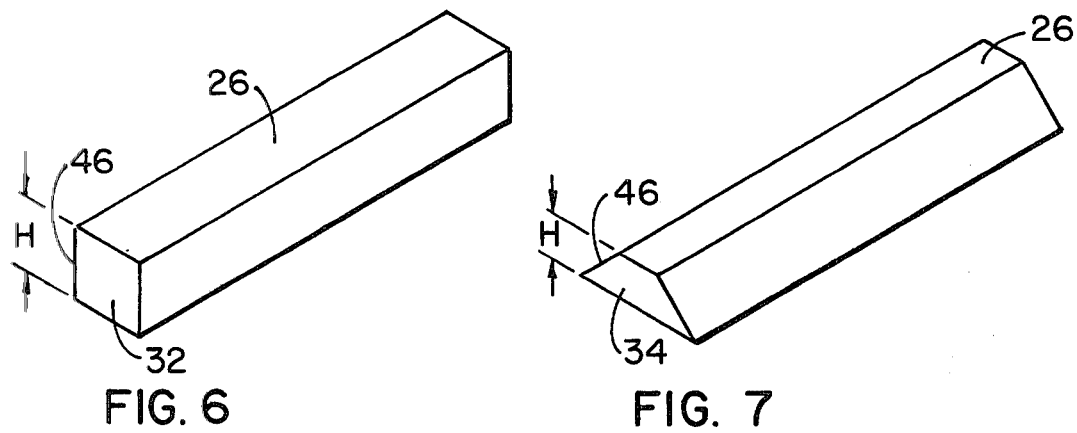

The rod elements may have any desired cross-sectional shape such as, for example, those exemplified by the triangular cross section 28 of FIG. 4, the sector cross section 30 of FIG. 5, the square cross section 32 of FIG. 6, and the trapezoidal cross section 34 of FIG. 7. More preferably, the rods have the triangular cross-sectional shape of FIG. 4 with top surfaces 26 rounded and substantially squared ends defining abrupt edges. The rod members or elements may have any desired length but it has been found that an aspect ratio of length of thickness of about 8:1 is suitable, and more preferably, the aspect ratio is at least about 20:1.

Figure 8:
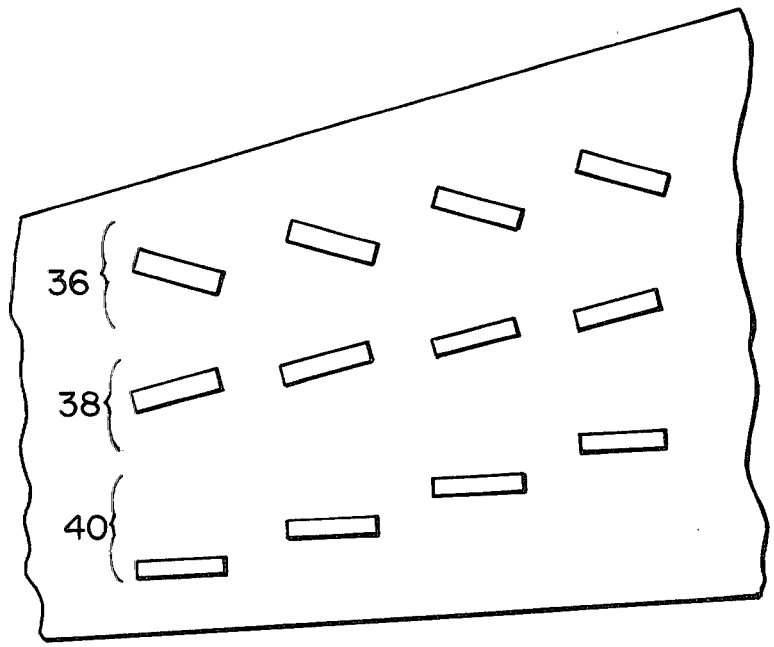
FIG. 8 is a plan view similar to that of FIG. 3 but showing rod members arranged in various patterns on an airfoil surface.

Not only may the rod elements be arranged generally within a row at plus, or minus angles in a row in relation to a normal to the airstream, but they may be staggered as exemplified by rows 36, 38, 40 of FIG. 8.

The height of the rod elements is from about 0.1 to about 0.5 times the thickness of the airfoil boundary layer but more preferably, the thickness is about 0.1 to about 0.2 times the thickness of the boundary layer. It should be pointed out that this thickness is about one-half or less than that height used for prior art devices in relationship to the boundary layer (i.e., vortex generators as exemplified in dotted form 42 in FIG. 2). More specifically, elements with a height of about 3 mm to about 4 mm, spaced from about 25 mm to about 50 mm, and with about 4 to about 16 elements per row may be used.

The top surface and ends of the elements combine with each other to define a serrated edge that induces turbulent flow in the airstream boundary layer. The top surface portion 26 of the rod elements define a means for inducing airstream boundary layer turbulence 44 about axis generally parallel with the rod while the end portions define edges 46 as a means for inducing airstream boundary layer turbulence 48 about axis generally parallel to the airstream. The edges and top surface portion combine to generate turbulence in the lower portion of the airstream boundary layer for the purpose of postponing the onset of airstream separation from the airfoil.

Figure 2:
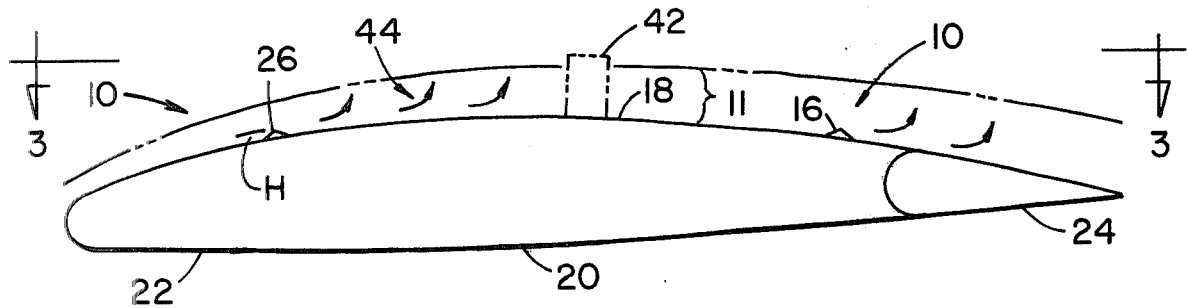
FIG. 2 is an enlarged cross-sectional view taken along the line 2—2 of FIG. 1.
Figure 3:
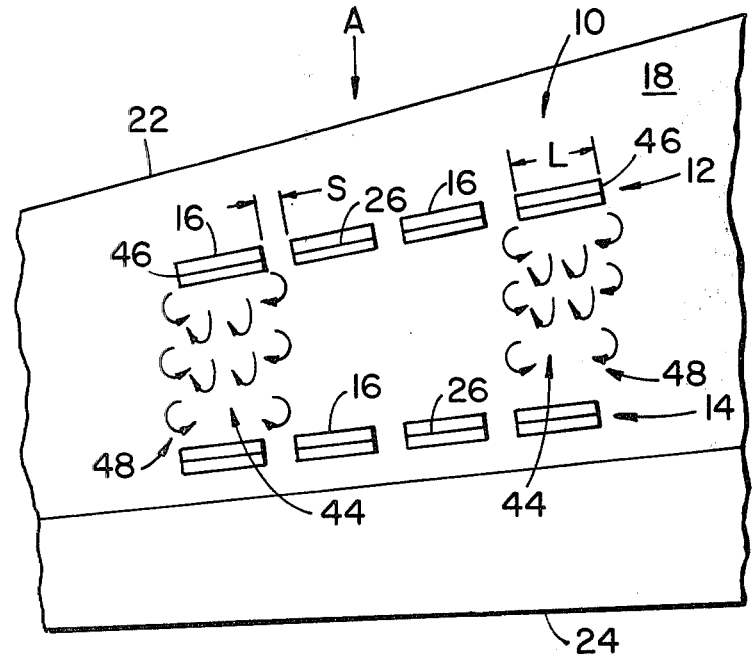
FIG. 3 is an enlarged partial view taken along the line 3—3 of FIG. 2.

The serrated edge was flight tested in a high speed aircraft having cable controlled ailerons. The rod elements were positioned on the wing substantially as shown in FIGS. 2 and 3. The serrated edge was effective by increasing the onset of aileron buzz from a Mach number of 0.82 to a Mach number of 0.86.

The foregoing description is made for purpose of illustration only and is not intended to limit the scope of the invention which is to be determined from the appended claims.

What is claimed is:

1. In an airstream flow modification device of the type secured to and extending beyond a normaly smooth contour surface of an aircraft airfoil to project into an airstream boundary layer and delay the onset of airstream flow separation from the airfoil while operating at higher aircraft speeds at Mach numbers of about 0.6 to about 0.9 when the airstream near the airfoil accelerates to supersonic speeds, the improvement comprising:

a plurality of spaced, generally rod shaped elements arranged generally end to end in at least one row and extending from said airfoil surface, each element having a height less than the boundary layer thickness formed at said aircraft speeds and a length oriented generally normal to the airstream flow within a range of about −30 degrees to about +30 degrees from a normal to the airstream flow.

2. The airfoil as claimed in claim 1 wherein the length of each element is oriented substantially at a constant percentage of a local airfoil chord.

3. The airfoil as claimed in claim 1 wherein the spacing between elements in a row is from about 0.2 to about 0.7 of the element length.

4. The airfoil as claimed in claim 1 wherein the elements of a row are staggered in relation to each other.

5. The airfoil as claimed in claim 1 wherein the elements extend from an upper contour surface of the airfoil.

6. The airfoil as claimed in claim 1 wherein there are at least two rows of elements where the elements in each row are substantially in alignment with each other.

7. The airfoil as claimed in claim 1 wherein the element height is from about 0.1 to about 0.5 of the boundary layer thickness.

8. The airfoil as claimed in claim 1 wherein the elements have generally a triangular cross section.

9. The airfoil as claimed in claim 1 wherein the elements have substantially squared end portions.

10. The airfoil as claimed in claim 1 wherein the top surface of each element is rounded.

11. The airfoil as claimed in claim 1 wherein the elements have a height from about 3 mm to about 4 mm and are spaced in end-to-end fashion from each other at a spacing from about 25 mm to about 50 mm.

12. The airfoil as claimed in claim 1 wherein there are from about 4 to about 16 elements per meter per row.

13. The airstream modification device as claimed in claim 1 where the spacing between adjacent rod members is less than the individual length of the rod members.

14. The airstream modification device as claimed in claim 1 wherein the rod members are of substantially equal length.

15. The airstream modification device as claimed in claim 1 wherein the rod members are linearly aligned and are substantially equally spaced.

16. The airstream modification device as claimed in claim 1 wherein the rod members have an aspect ratio of length to thickness of at least about 8:1.

17. The airstream modification device as claimed in claim 1 wherein the rod end portions have abrupt edges.

* * * * *